United States Patent

[11] 3,576,249

[72] Inventor Glenn R. Grissinger
 York, Pa.
[21] Appl. No. 854,603
[22] Filed Sept. 2, 1969
[45] Patented Apr. 27, 1971
[73] Assignee Teledyne, Inc.
 York, Pa.

[54] CORNER TRANSFER CONVEYING APPARATUS FOR BAKING PANS
 8 Claims, 8 Drawing Figs.
[52] U.S. Cl............................................ 198/76,
 198/102
[51] Int. Cl........................................ B65g 37/00
[50] Field of Search...................................... 271/(CFCD);
 198/20, 76, 92, 93, 95, 102

[56] References Cited
UNITED STATES PATENTS

| | | | |
|---|---|---|---|
| 3,470,998 | 10/1969 | Zuercher...................... | 198/76X |
| 1,537,914 | 5/1925 | Bausman...................... | 198/76X |
| 2,805,760 | 9/1957 | Von Stroh et al............. | 198/95X |
| 3,268,058 | 8/1966 | Buckeridge et al........... | 198/92 |

Primary Examiner—Joseph Wegbreit
Assistant Examiner—Bruce H. Stoner, Jr.
Attorney—Otto Moeller ABSTRACT: A corner transfer apparatus for transferring articles from a first conveyor to a second conveyor disposed at right angles to the first conveyor while retaining the articles throughout such transfer in their original orientation on the first conveyor including a transfer conveyor forming a longitudinal extension of the first conveyor and offset to one side of the longitudinal centerline extended of the first conveyor and a transporting conveyor having one corner at its receiving end subjacent the discharge end of the first conveyor and the other corner at its receiving end subjacent the side of the transfer conveyor, with the longitudinal centerline extended of the transporting conveyor intersecting the discharge end of the first conveyor at an acute angle so that when the trailing end of an article leaves the discharge end of the first conveyor, the article because of its overhanging weight drops onto and is conveyed by the transporting conveyor in its original orientation and discharged in such original orientation onto the second conveyor.

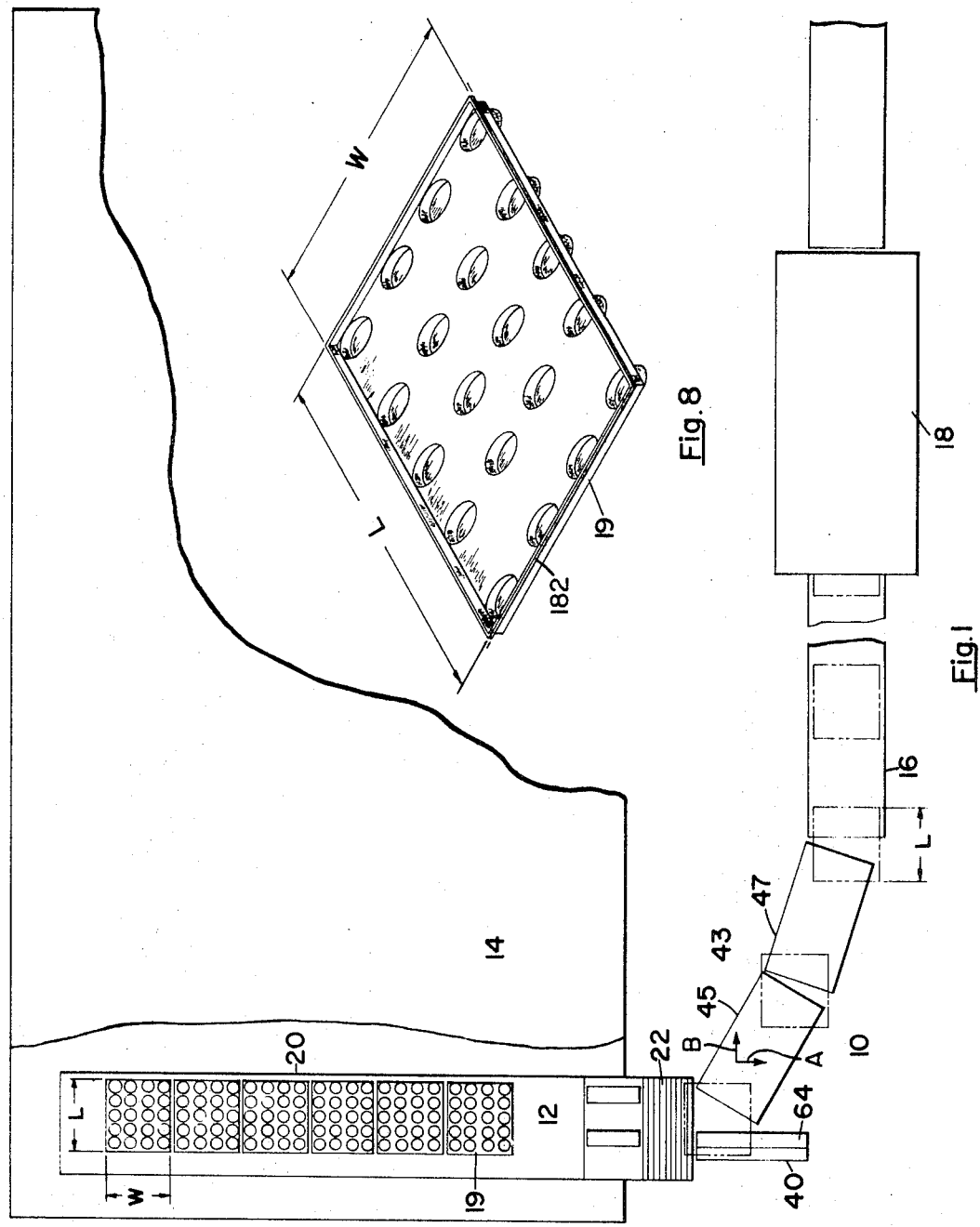

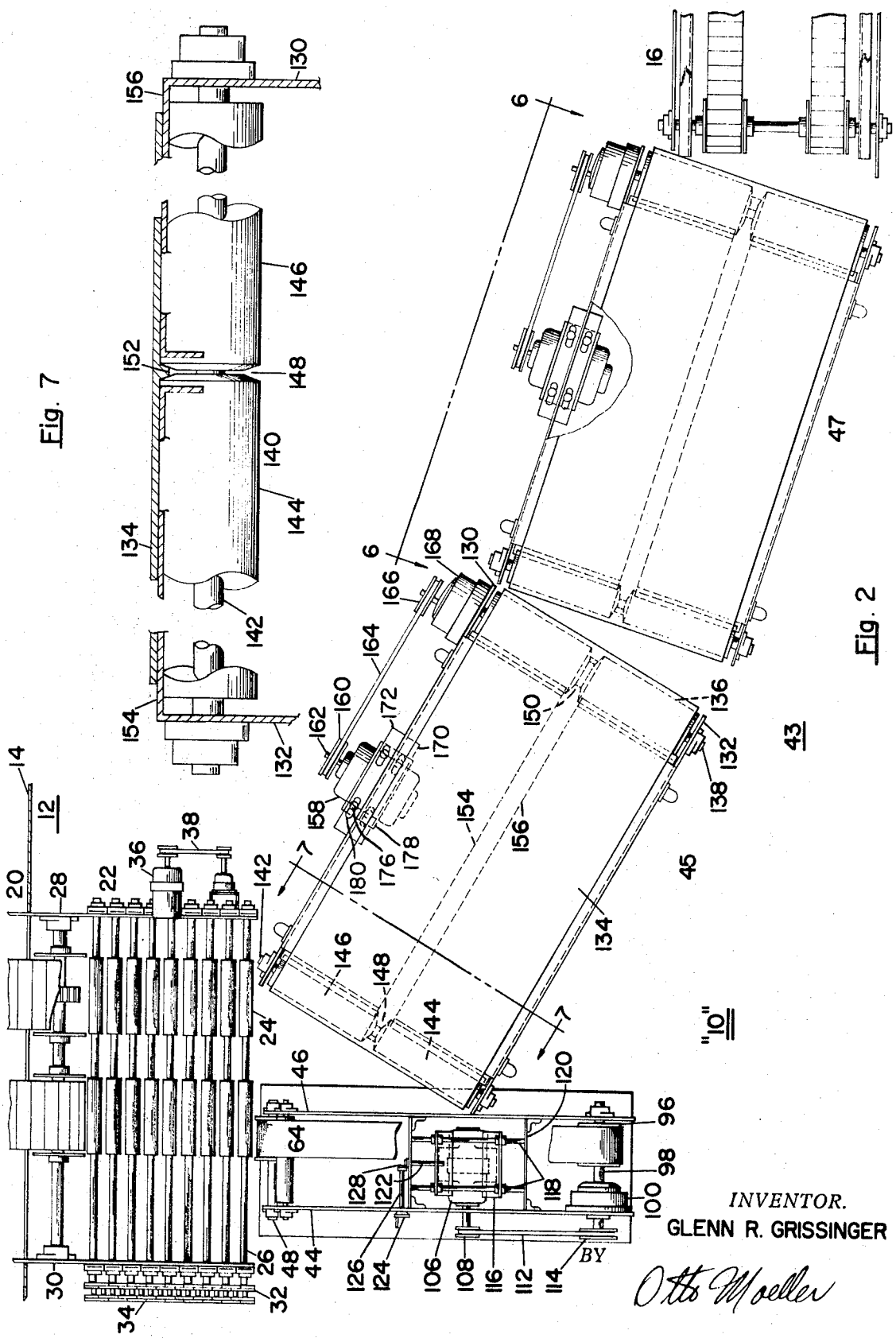

PATENTED APR 27 1971 3,576,249

INVENTOR.
GLENN R. GRISSINGER
BY
Otto Moeller

CORNER TRANSFER CONVEYING APPARATUS FOR BAKING PANS

BACKGROUND AND SUMMARY OF THE INVENTION

This invention relates to a corner transfer apparatus, and more particularly to a transfer apparatus for transferring successive pans of baked goods from the discharge conveyor of a commercial oven to a conveyor disposed at right angles thereto that delivers the pans to an automatic depanner. In commercial type ovens successive row of pans of dough are loaded onto the traveling trays of an oven for passage through the oven. The successive rows of pans of baked product are pushed off onto a discharge conveyor. The pans are disposed on the trays in the direction of their length, such pans generally being rectangular with a greater length than width, so that a maximum number of pans can be accommodated on each tray. The pans after being pushed onto the oven discharge conveyor are in close proximity to each other and are moved by the discharge conveyor in a direction normal to their long dimension. However, these pans must be moved by the depanner feeding conveyor to the depanner in the direction of their long dimension. In other words, the pans after being transferred must be in the same orientation as they were on the oven discharge conveyor.

In one form of prior art transfer apparatus, the discharge end of a first conveyor and the receiving end of a second conveyor are in abutting relation, so that if the pans are in close order, a leading pan upon being delivered onto the second conveyor must be moved at an excessive speed in order to clear and avoid a trailing pan on the first conveyor. At such excessive speeds it is impossible to maintain the pans in their proper orientation. In another form of transfer apparatus the transfer is accomplished by moving the pans by a pair of arcuate parallel chain conveyors arranged to travel at different speeds. In such devices the pans must turn relative to the curved conveyors to provide for proper orientation and control of the pans to avoid disorientation and pan dislocation or jamming is difficult to maintain.

The transfer apparatus of the present invention provides for transfer of the pans at high production rates by conveying means operating at speeds that render negligible dislocation or jamming of the pans and that present the pans to the depanner feeding conveyor in proper orientation for depanning.

Another object of the invention is to provide a corner transfer conveyor for transferring successive pans, even through disposed in close order, from the discharge end of a first conveyor to the receiving end of a second conveyor disposed at right angles to the first, while retaining the original orientation of the pans throughout their transfer.

Another object is to provide a corner transfer conveyor including a transporting conveyor disposed between a first conveyor and a second conveyor at right angles to the first, in which the transporting conveyor is disposed with its longitudinal centerline extended intersecting the discharge end of the first conveyor at an acute angle, and operating means for operating the transporting conveyor at a speed to move a leading pan deposited thereon in the direction of its length and in the direction of its width such as to prevent engagement therewith of a trailing pan.

Other objects and advantages of the invention will be hereinafter pointed out or will become apparent from the following description when read in conjunction with the accompanying drawings.

BRIEF DESCRIPTION OF THE DRAWINGS

FIG. 1 is a diagrammatic view in plan of the novel corner pan transfer apparatus as applied to a baking oven discharge conveyor and a depanner pan feed conveyor;

FIG. 2 is an enlarged more detailed plan view of the corner pan transfer apparatus shown in FIG. 1, disposed between the discharge end of the oven discharge conveyor and the receiving end of the depanner pan feed conveyor;

FIG. 6 is a side elevational view of one of the identical transporting conveyor sections of the corner transfer apparatus;

FIG. 7 is a sectional view taken on the line 7-7 of FIG. 2; and

FIG. 8 is a view in perspective of a typical bun pan adapted to be conveyed by the corner transfer apparatus.

Figure 4:
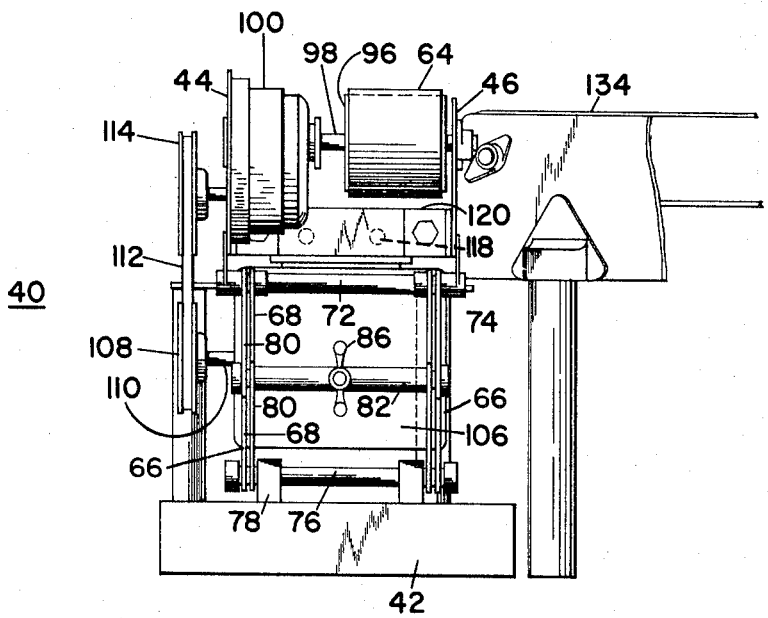
FIG. 4 is a view in end elevation of the adjacent ends of the transfer conveyor and transporting conveyor of the corner pan transfer apparatus.

Referring to the diagrammatic layout of FIG. 1, the transfer device 10 is shown, for purpose of illustration, for transporting bun pans of baked product from the delivery end of the baking pan discharge conveyor 12 of an oven 14 to a conveyor 16 disposed at a right angle to the discharge conveyor 12 for conveying the transported pans of baked product to an automatic depanner 18.

In commercial type ovens successive transverse rows of pans of dough are transported on traveling trays through the oven for baking and the successive rows of pans of baked product are pushed off successive trays onto the oven discharge conveyor 12. Ovens of this general type are conventional in the baking industry, a typical example of which is shown in Messerly et al. Pat. No. 3,395,653, so that the details of construction are not shown or described in the present application.

Bun pans 19 are of rectangular configuration, generally of greater length $l$ than width $w$ as shown in FIGS. 1 and 8, though some may be substantially square, and depending on the particular type of bun being processed at the makeup station or for other reasons, the ratio of length to width of the pans of one run of pans may vary considerably from that of a succeeding run of pans. Successive rows of pans of dough are loaded onto the trays of the oven in the direction of the long dimension $l$ of the pans for the obvious purpose of permitting a maximum number of pans to be accommodated on each tray. Conventional intermittently operated pusher means, as shown for example in the above referred to patent, is employed for pushing successive rows of pans from successive oven trays onto the intermittently operated oven discharge conveyor 12. The pans are pushed onto the oven discharge conveyor 12 so that they assume thereon the position as shown in FIG. 1.

The pans, in being discharged from the oven by discharge conveyor 12, now travel in a direction normal to their long dimension $l$. From the discharge conveyor 12, the pans are transferred by the transfer means 10 to the conveyor 16, which is disposed with its longitudinal centerline at a right angle with respect to the longitudinal centerline of the discharge conveyor 12 and leads to the automatic depanner 18. For the proper operation of depanning devices in general use today it is necessary that the pans travel along the conveyor 16 to the depanner 18 in the direction of their long dimension $l$. The transfer means 10 must therefore be adapted to provide for angular change in direction of movement of the pans while retaining them in the same orientation on conveyor 16 that they had on discharge conveyor 12, or in other words their long dimension $l$ does not change directionally.

It has been common in past practice to effect such pan transfer by disposing the discharge end of the discharge conveyor 12 and the receiving end of the conveyor 16 in abutting relation. In such arrangements a leading pan has to be moved transversely from in front of a closely following succeeding pan at a very rapid rate of speed in order to prevent the succeeding pan from overtaking and colliding with the preceding pan. At excessive speeds of the conveyors it is impossible to maintain control of the pans and as a result frequent jam up of pans occur during such transition or the pans are improperly oriented for presentation to the depanner 18.

Referring particularly to FIGS. 1 and 2, the oven discharge conveyor 12 includes a main conveyor section 20 that is operated intermittently in a manner and by means conventional in the art for conveying from the oven successive rows of pans unloaded onto the conveyor section 20 from successive oven trays. The speed of the main conveyor section 20 is such as to provide a clear space on its top run to receive a row of pans unloaded from a next succeeding oven tray.

Where the articles, as for example pans in the present instance, are closely spaced or in touching relation, the oven discharge conveyor 12 preferably includes a separate short auxiliary conveyor section 22 at the delivery end of the main conveyor section 20 operated independently of the main conveyor section 20 and at a conveying speed somewhat greater than the conveying speed of the main conveyor section to draw a gap or a somewhat greater gap, as the case may be, between the discharged pans. The pans as loaded on the trays of the oven are spaced slightly apart, generally about 1 inch, to provide maximum loading of each tray while permitting circulation of heated oven atmosphere around all sides of the pans for uniform baking. Due to mechanical limitations it is impossible to accurately provide and maintain such spacing, so that at times two pans may actually be in side-by-side contact on the main conveyor section 20. The speed of the auxiliary conveyor section 22 relative to the main conveyor speed is therefore established with this worst condition, namely two contacting pans, in mind, to draw a gap between such pans of several inches.

The auxiliary conveyor section 22, when employed, may be of any suitable type, preferably of well-known powered roller type as shown in FIG. 2, so that the adjacent ends of the conveyor sections 20 and 22 may be disposed in close proximity to each other. The auxiliary conveyor section 22 includes closely spaced rollers 24 mounted on shafts 26 suitably journaled at their ends in side frame members 28 and 30. Mounted on the outer projecting ends of the shafts 26 are sprockets 32 around which an endless drive chain 34 is trained. A motor 36 is connected to the drive chain 34 through suitable gear reducer and variable speed changing sheave means, indicated generally by the reference numeral 38, for adjusting the speed of the roller conveyor section 22 so that it will move the pans at a sufficiently relatively higher rate of speed than the main conveyor section 20 to provide the above set forth desired spacing between the pans.

The transfer device 10 includes a pan transfer conveyor 40 supported on a base 42 in a manner to be described and disposed in longitudinal alignment with the oven discharge conveyor 12 but offset forwardly of the longitudinal centerline extended of the oven discharge conveyor 12, as best shown in FIG. 2. Additionally the transfer device 10 includes a pan transporting conveyor 43, preferably in the form of a pair of identical angularly disposed pan transporting conveyor sections 45 and 47, disposed between the discharge end of oven discharge conveyor 12 and the receiving end of the conveyor 16.

Figure 5:
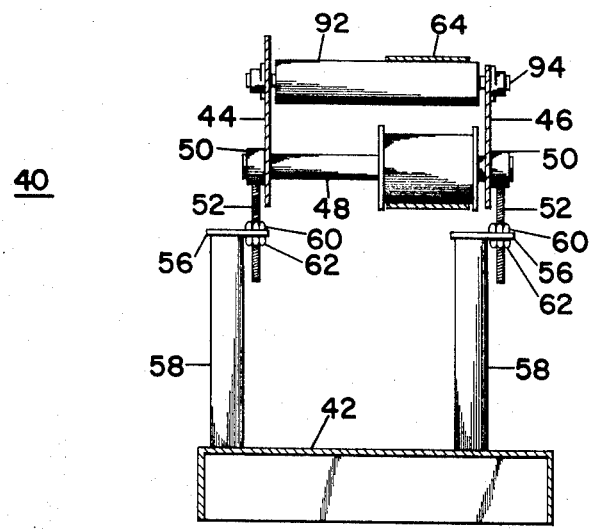
FIG. 5 is a sectional view taken on the line 5-5 of FIG. 3.

The transfer conveyor 40 includes a pair of spaced parallel side frames 44 and 46 mounted at their ends adjacent the discharge end of the roll conveyor section 22 for swinging movement in a vertical plane on a transversely extending tail shaft 48. On each of the projecting ends of the tail shaft 48, as best shown in FIG. 5, is secured a set collar 50. Each of the set collars 50 is provided with a depending threaded stem 52 adapted to extend freely through an opening in a flange plate 56 secured to the upper end of each of a pair of upstanding posts 58 on the tail end of the base 42. Upper and lower nuts 60 and 62 threaded on the threaded stems 52 above and below the flange plates 56 provide means whereby the height of the tail end of the transfer conveyor 40 may be adjusted to bring the tail end of the pan conveying surface of the transfer conveyor belt 64 level with the peripheral pan supporting portion of the final roller of the roll conveyor section 22 of the oven discharge conveyor 12.

Figure 3:
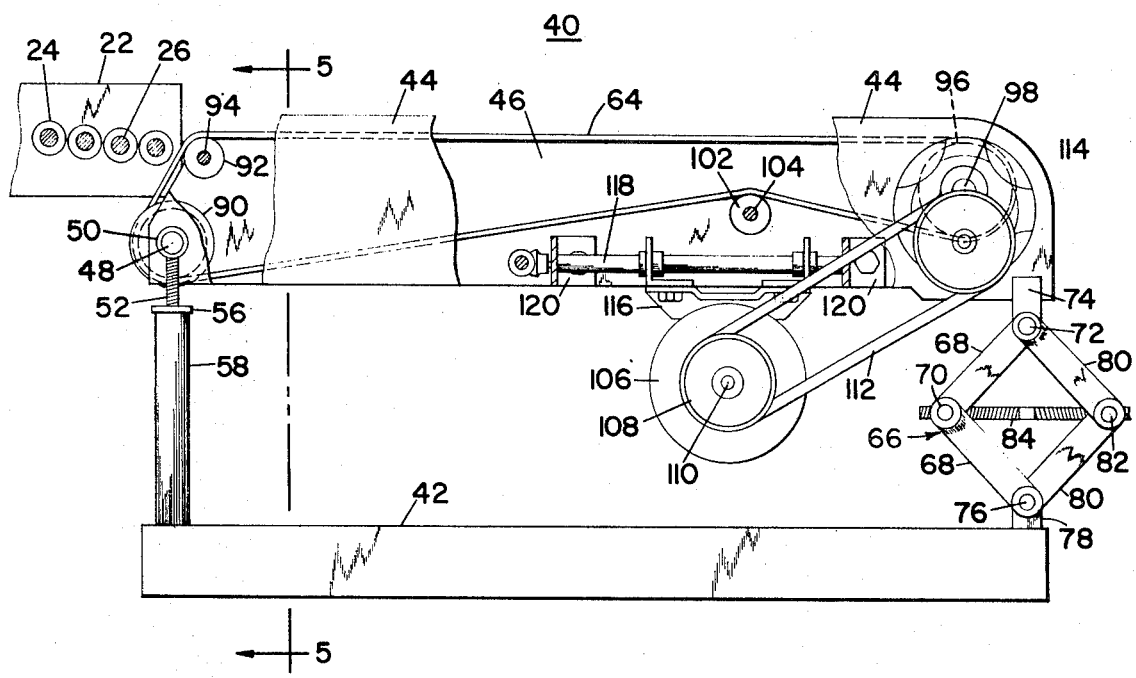
FIG. 3 is a side elevation of the transfer conveyor of the corner transfer apparatus with parts broken away.
Figure 6:
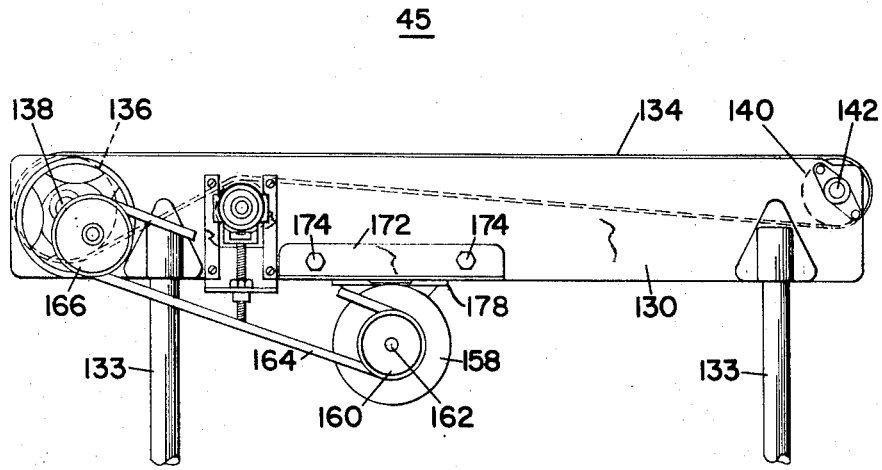
FIG. 6 is a side elevational view taken on the line 5-5 of FIG. 3.

At its head end the transfer conveyor 40 is supported on the base 42 by a toggle means, indicated by the reference numeral 66, for adjustably raising or lowering the transfer conveyor 40 about its swingably mounted tail end. Referring to FIGS. 3 and 4, the toggle means 66 includes a pair of links 68 pivotally connected together on one end of a transversely extending shaft 70, and pivotally connected one to a transversely extending shaft 72 supported at one end in a bracket 74 fixed to transfer conveyor side frame 44, and one to a transversely extending shaft 76 supported at one end in a bracket 78 on the base 42. A second pair of links 80 are pivotally connected together on one end of a transversely extending shaft 82 and pivotally connected one to transversely extending shaft 72 and one to transversely extending shaft 76. A similar link and bracket arrangement connects the transfer conveyor side frame 46 with the base 42. A threaded shaft 84 is threaded through and connects the shafts 70 and 82, and has secured at one end thereof a handwheel 86. The threaded portions of shaft 84 threaded in the shafts 70 and 82 are of opposite hand so that upon rotation of the handwheel 86 the links 68 and 80 are moved together or apart to raise or lower the head end of the transfer conveyor 40 into variable positions of adjustment for reasons hereinafter described.

The transfer conveyor 40 includes the endless belt 64 which is trained around a tracking pulley 90 mounted on the tail shaft 48; a guide roller 92 mounted on a shaft 94 journaled at its ends in bearings carried by the upper tail end portions of the transfer conveyor side frames 44 and 46; a tracking drive pulley 96 mounted on a drive shaft 98 journaled at one end in a bearing carried by the head end portion of the transfer conveyor side frame 46 and connected at its other end with the output shaft of a gear reducer 100 carried by the head end portion of the transfer conveyor side frame 44; and a guide roller 102 for the lower run of the belt 64 mounted on a shaft 104 journaled at its ends in bearings carried by the transfer conveyor side frames 44 and 46. The small guide roller 92 and the tracking drive pulley 96 provide the endless belt 64 with a pan supporting and conveying run, the receiving end of which is disposed closely adjacent the discharge end of the auxiliary conveyor section 22 of the oven discharge conveyor 12. The belt 64, for reasons to be described, is formed of a material having a low coefficient of friction, such as "Dacron" a synthetic material manufactured by Du Pont.

The drive shaft 98 that drives the belt 64 through drive pulley 96 is operatively connected to a motor 106. The motor 106 drives a variable speed pulley 108 mounted on motor shaft 110 for driving an endless belt 112 which extends around pulley 108 and also around a pulley 114 mounted on the input shaft of gear reducer 100 which in turn, as previously pointed out, is operatively connected with the drive shaft 98.

The motor 106 is pendently supported by bracket means 116 for slidable fore-and-aft movement on a pair of transversely spaced longitudinally extending rods 118, the ends of which are secured to longitudinally spaced transversely extending brackets 120 between and secured to the transfer conveyor side frames 44 and 46. A longitudinally extending shaft 122, rotatably mounted in one of the brackets 120, is provided with a threaded end portion (not shown) threaded into the motor support bracket means 116 so that by turning the handwheel 124 secured on the outer end of a transversely extending adjusting shaft 126, the inner end of which is operatively connected with the free end of threaded shaft 122 through bevel gearing 128, the motor 106 may be moved longitudinally. This in turn will either increase or decrease the tension in belt 112 and in the manner, through variable speed pulley 108, the speed of drive shaft 98 and the endless transfer conveyor belt 88 may be adjusted.

The speed of the transfer conveyor belt 64 is adjusted to operate at approximately the speed of the roll conveyor section 22 of the oven discharge conveyor 12 to maintain the previously referred to gap between successive pans drawn by the roll conveyor section 22 as the pans are discharged therefrom, where it is desirable to provide such a gap.

As shown in FIG. 1, the width of the transfer conveyor belt 64 is considerably less than half the long dimension $l$ of the pans, and as previously pointed out it is offset forwardly of the longitudinal centerline extended of the oven discharge conveyor 12, so that a considerably greater portion of a pan overhangs the conveyor belt 64 as a pan moves therealong from the discharge conveyor 12 than is supported thereon. Now, when the trailing edge of a pan leaves the discharge end of the discharge conveyor 12, the pan becomes overbalanced and its overhanging end portion drops down onto the rearward end portion of the previously referred to transporting conveyor section 45 of transporting conveyor 43.

As previously pointed out, means is provided for pivotally raising the transfer conveyor 40 about the tail shaft 48 to any one of a number of upwardly tilted adjusted positions. By adjusting the transfer conveyor 40 to slight but different degrees of tilt a pan is projected a proportionately greater distance forward of the discharge end of the oven discharge conveyor 12 before dropping onto the conveyor section 45 whereby to position the pan in desired position on the conveyor section 45.

The transporting conveyor section 45 includes a pair of side frame members 130 and 132 retained in laterally spaced relation by suitable crossbars, not shown, and is supported in any suitable manner above the floor, as by leg standards 133. An endless belt 134 is trained at one end around a drive pulley 136 keyed, or otherwise secured, on a head shaft 138 journaled at its ends in the head ends of the side frame members 130 and 132. At its opposite end the endless belt 134 is trained around a driven pulley 140 keyed, or otherwise secured, on a tail shaft 142 journaled at its ends in the tail ends of the side frame members 130 and 132.

Referring to FIGS. 2 and 7, the driven pulley 140 is preferably in the form of a pair of pulley sections 144 and 146, beveled and slightly separated at their adjacent ends to form a V-shaped tracking groove 148. The drive pulley 136 is similarly formed to provide a V-shaped tracking groove 150. The V-shaped tracking grooves 148 and 150 are adapted to snugly receive an endless longitudinally extending rib 152 formed on the inner face of the endless belt 134 midway between the sides thereof to thereby prevent any lateral shifting of the belt 134. The upper run of the endless belt 134 is supported on the top surface of a pair of longitudinal slide beds 154 and 156 disposed at each side of the belt rib 152, the slide beds 154 and 156 being supported in any suitable manner from the side frame members 130 and 132.

The drive shaft 138 that drives the endless belt 134 through drive pulley 136 is operatively connected to a motor 158. The motor 158 drives a variable speed pulley 160 mounted on motor shaft 162 for driving an endless belt 164 which extends around pulley 160 and also around a pulley 166 mounted on the input shaft of a gear reducer 168 which in turn is operatively connected with the drive shaft 138.

The motor 158 is pendently and longitudinally adjustably supported by L-shaped brackets 170 and 172 respectively secured, by suitable means such as capscrews 174, to the inner and outer sides of side frame member 130. Capscrews 176 extending through openings in motor baseplate 178 and longitudinally elongated slots 180 in the brackets 170 and 172 permit securing of the motor 158 in any one of a number of longitudinally adjusted positions. Longitudinal adjustment of the motor 158 will either increase or decrease the tension in belt 164 and in this manner, through variable speed pulley 160, the speed of drive shaft 138 and consequently the speed of belt conveyor 134 may be adjusted.

The transporting conveyor section 45 is disposed with one corner of its upstream end adjacent the rear of the discharge end of the oven discharge conveyor 12 and the other corner of its upstream end adjacent the side of the transfer conveyor 40, with the longitudinal centerline extended of the transporting conveyor section intersecting the discharge end of the oven discharge conveyor 12 at an acute angle. The pan supporting surface of the endless belt 134 of transporting conveyor section 45 is disposed at its receiving end in a plane below the pan supporting plane of the discharge end of the oven discharge conveyor 12 and the receiving end of the transfer conveyor belt 64, preferably about 1 inch, so that as previously described, when the trailing edge of a pan leaves the discharge end of the oven discharge conveyor 12, the overhanging portion of the pan drops down onto the upstream end of the transporting conveyor belt 134.

The conveyor belt 134 is formed of a material such as canvas that has a high coefficient of friction relative to that of the "Dacron" transfer conveyor belt 64. This and the fact that the overhanging portion of the pan exerts a greater pressure on the belt 134 than the portion of the pan on the belt 64 exerts on the belt 64 causes the pan to be deposited on the belt 134 and conveyed thereby without any significant change in the orientation of the pan. In other words, the pan is received and moved by the conveyor belt 134 of the transporting conveyor 43 without change in direction of its long dimension axis $l$.

The transporting conveyor section 45 is operated by motor 158 at a rate of speed such that at the particular selected angle of conveyor section 45, a pan upon being deposited thereon will move at a speed in the direction indicated by arrow $A$ and in the direction indicated by arrow $B$ (see FIG. 1) that it will not be engaged and fouled by a trailing pan, irrespective of how close together these pans may have been on the oven discharge conveyor 12. The required speed of the conveyor section 45 necessary to prevent such engagement of the pans may vary with the dimensions of the pans and the particular selected angle of the conveyor section 45, and such change in speed is accomplished through the previously described speed change mechanism for the transporting conveyor belt 134.

As previously stated, the transporting conveyor 43 of the transfer device 10 is preferably in the form of a pair of identical angularly related transporting conveyor sections 45 and 47, so that the above description of the construction of conveyor section 45 applies also to conveyor section 47. To avoid repetition the construction of conveyor section 47 is therefore omitted. With such an arrangement the angle between the discharge end of the transporting conveyor 43 and the receiving end of the depanner feeding conveyor 16 can be reduced in half, so as to facilitate and retain better control of the pans as they are delivered from the transporting conveyor 43 to the depanner feeding conveyor 16.

As previously stated, the transporting conveyor section 45 is disposed with the longitudinal centerline extended thereof intersecting the discharge end of the oven discharge conveyor 12 at an acute angle. This angle is preferably about the angle of the diagonal of the pan since at such an angle the transporting conveyor 43 can be operated at a slower speed than at any other angle and yet permit the leading pan, even under the worst possible condition where it is closely followed by a trailing pan, to clear the trailing pan when it is transferred to the transporting conveyor 43.

For example, assume the discharge conveyor 12 is operating at 80 f.p.m. to assure that a row of pans is conveyed out of the oven by the time the next row of pans is pushed onto the discharge conveyor, and the transfer conveyor 40 is also operating at 80 f.p.m. Assume further that the pans have a lengthwise dimension $l$ of 30 inches and a widthwise dimension $w$ of 27 inches. Under these conditions it is apparent that a pan must travel 30 inches in the direction of arrow A in the same time that it travels 27 inches in the direction of arrow B, in order to prevent fouling of a trailing pan against a leading pan. The diagonal of such a pan is 42° and with the transporting conveyor 43 disposed at a 42° angle, the speed of the transporting conveyor 43 disposed at a 42° angle, the speed of the transporting conveyor 43 that will preclude fouling of a trailing pan against a leading pan need be only 119.5 f.p.m. At his speed the pan on the transporting conveyor will move 27 inches in the direction of arrow A at 80 f.p.m. and 30 inches in the direction of arrow B at 88.9 f.p.m. The speed of the transporting conveyor 43 can be increased if desired to provide a desired longitudinal and lateral gap between successive pans on the transporting conveyor 43 without causing operation of the transporting conveyor 43 at a speed that will materially affect control of the pans.

Where it is desired to increase the longitudinal gap disproportionately to the lateral gap or where the angle between the discharge end of the transporting conveyor 43 and the receiving end of the depanner feeding conveyor 16 is desirably decreased, the angle of the transporting conveyor 43 may be materially reduced below the diagonal of the pans. For example, with the same pans as above and the transporting conveyor 43 at a 30° angle, as shown in the drawings, instead of a 42° angle, transporting conveyor 43 must operate at a speed of 160 f.p.m. in order that a pan dropped onto conveyor 43 will move in the direction of arrow A at 80 f.p.m. to prevent it from being overtaken and fouled by a trailing pan. At this speed of the transporting conveyor 43, the pan will move in the direction of the arrow B at a speed of 138.6 f.p.m. so that while the pan moves 27 inches in the direction of arrow B, so that there will be a longitudinal gap between a leading and a trailing pan on transporting conveyor 43 of (46.8—30) inches, or 16.8 inches.

The angle of transporting conveyor 43 may thus vary with respect to the diagonal of the pans, however, it should not vary to such an extent that transporting conveyor 43 must be operated at such a speed as to sacrifice control of the pans as they are delivered onto and conveyed by the transporting conveyor 43.

The auxiliary conveyor section 22 of oven discharge conveyor 12 preferably slopes slightly downwardly from the main conveyor section 20, as best shown in FIG. 3. Bun pans, as best shown in FIG. 8, are generally provided at their upper edge with an outwardly projecting bead 182 and where two pans happen to contact each other as they are conveyed along the main discharge conveyor section 20, the beads occasionally overlap and interlock, so that dislocation and jamming of the pans may occur during transfer to transporting conveyor 43 of a leading pan relative to the trailing pan. With the auxiliary conveyor section 22 sloped as noted above, the tipping of the leading pan effects a separation of the overlapped beads, and with auxiliary conveyor section 22 operating at a slightly greater speed than the main conveyor section 20, the two pans will separate sufficiently to prevent the trailing pan from fouling the leading pan when the leading pan is transferred.

While the invention has been shown and described with particular reference to bun pans, it should be understood that it applies also to conventional straps of bread pans.

Although I have disclosed an exemplary embodiment of my invention herein, it will be understood that various changes, modifications and substitutions may be incorporated in such embodiment without departing from the spirit of the invention.

I claim:

1. A corner transfer apparatus adapted to receive conveyed articles from a first conveyor and to deliver same to a second conveyor disposed at right angles to said first conveyor while retaining said articles in their original orientation, comprising:

a transfer conveyor forming a longitudinal extension of said first conveyor offset to one side of the longitudinal centerline extended of said first conveyor to provide marginal support for the underside edge portion of articles as said articles move along said transfer conveyor from the discharge end of said first conveyor;

a transporting conveyor disposed with its longitudinal centerline at an acute angle with the discharge end of said first conveyor and having one corner at its receiving end disposed subjacent the discharge end of said first conveyor and having the other corner at its receiving end disposed subjacent the side of said transfer conveyor so that articles upon discharge from said first conveyor become overbalanced and drop by gravity from said transfer conveyor onto said transporting conveyor;

means for operating said transfer conveyor at a speed at least equal to the speed of said first conveyor at its discharge end;

and means for operating said transporting conveyor at a speed for moving an article deposited thereon so that its component speeds in a direction parallel to said transfer conveyor and in a direction normal thereto is such as to prevent engagement therewith of a trailing article.

2. The corner transfer apparatus as set forth in claim 1, including means mounting said transfer conveyor at its end adjacent said first conveyor for pivotal movement about a horizontal transversely extending axis, and means connected to the opposite end of said transfer conveyor for pivoting the latter to any one of a number of adjusted positions.

3. The corner transfer apparatus as set forth in claim 1, wherein said transporting conveyor is comprised of a pair of identical angularly related transporting conveyor sections.

4. The corner transfer apparatus as set forth in claim 1, wherein the transporting conveyor is disposed at an angle relative the discharge end of said first conveyor approximately equal to the diagonal of the article conveyed.

5. The corner transfer apparatus as set forth in claim 1, wherein the said first conveyor includes a main conveyor section and an auxiliary conveyor section at the discharge end of said main conveyor section, and means for operating said auxiliary conveyor section at a slightly greater speed than said main conveyor section to provide a gap between a leading article and a contacting trailing article.

6. The corner transfer apparatus as set forth in claim 5, wherein the article supporting surface of said auxiliary conveyor section slopes slightly downwardly from the article supporting surface of said main conveyor section.

7. The corner transfer apparatus as set forth in claim 1, wherein the operating means for said transporting conveyor includes means for varying the speed of said transporting conveyor to provide a desired spacing between a leading article and a trailing article.

8. A corner transfer apparatus adapted to receive conveyed articles from a first conveyor and to deliver same to a second conveyor disposed at right angles to said first conveyor while retaining said articles in their original orientation, comprising:

a transfer belt conveyor forming a longitudinal extension of said first conveyor offset to one side of the longitudinal centerline extended of said first conveyor to provide marginal support for the under side edge portions of articles as said articles move along said transfer belt conveyor from the discharge end of said first conveyor, said transfer belt conveyor having a relatively low coefficient of friction;

a transporting belt conveyor disposed with its longitudinal centerline at an acute angle with the discharge end of said first conveyor and having one corner at its receiving end disposed subjacent the discharge end of said first conveyor and having the other corner at its receiving end disposed subjacent the side of said transfer belt conveyor so that articles upon discharge from said first conveyor become overbalanced and drop by gravity from said transfer belt conveyor having a relatively high coefficient of friction;

means for operating said transfer belt conveyor at a speed at least equal to the speed of said first conveyor at its discharge end; and means for operating said transporting belt conveyor at a speed for moving an article deposited thereon so that its component speeds in a direction parallel to said transfer belt conveyor and in a direction normal thereto is such as to prevent engagement therewith of a trailing article.